(12) United States Patent
Yang

(10) Patent No.: US 7,881,076 B2
(45) Date of Patent: Feb. 1, 2011

(54) BUCK-BOOST PFC CONVERTERS

(75) Inventor: Ta-Yung Yang, Milpitas, CA (US)

(73) Assignee: System General Corporation, Sindian, Taipei County (TW)

( * ) Notice: Subject to any disclaimer, the term of this patent is extended or adjusted under 35 U.S.C. 154(b) by 163 days.

(21) Appl. No.: 12/357,491

(22) Filed: Jan. 22, 2009

(65) Prior Publication Data

US 2010/0007317 A1 Jan. 14, 2010

Related U.S. Application Data

(60) Provisional application No. 61/134,490, filed on Jul. 9, 2008.

(51) Int. Cl.
*H02M 3/335* (2006.01)

(52) U.S. Cl. .................. 363/21.06; 363/22; 323/271; 323/282

(58) Field of Classification Search ............ 363/13, 363/17, 18, 19, 20, 21.01, 21.04, 21.06, 22, 363/274, 133, 134
See application file for complete search history.

(56) References Cited

U.S. PATENT DOCUMENTS 6,903,914 B1 *   6/2005   Moussaoui ............... 361/111
7,116,090 B1    10/2006   Yang et al.
7,218,081 B2 *   5/2007   Jang et al. ................ 323/266
7,460,380 B2 * 12/2008   Yang ....................... 363/131
2002/0089860 A1 * 7/2002 Kashima et al. ............ 363/13

* cited by examiner

*Primary Examiner*—Adolf Berhane
*Assistant Examiner*—Nguyen Tran
(74) *Attorney, Agent, or Firm*—Thomas, Kayden, Horstemeyer & Risley

(57) ABSTRACT

A buck-boost PFC converter is provided and includes an inductor, first and second transistors, a first diode, and a control circuit. The inductor has a first terminal and a second terminal. The first transistor is coupled to a positive-power rail and the first terminal of the inductor. The second transistor is coupled to the second terminal of the inductor and a negative-power rail. The first diode is connected from the second terminal of the inductor to an output of the buck-boost PFC converter. The control circuit generates a first signal and a second signal coupled to control the first transistor and the second transistor respectively. The first signal is utilized to turn on the first transistor for conducting the positive-power rail to the inductor. The second signal is utilized to turn on the second transistor for conducting the inductor to the negative-power rail.

10 Claims, 3 Drawing Sheets

BUCK-BOOST PFC CONVERTERS

CROSS REFERENCE TO RELATED APPLICATIONS

The present application claims the benefit of U.S. provisional application entitled "A Buck-Boost PFC Converter", Ser. No. 61/134,490, filed Jul. 9, 2008.

BACKGROUND OF THE INVENTION

1. Field of the Invention

The invention relates to a buck-boost converter, and more particularly to a buck-boost power factor correction (PFC) converter.

2. Description of the Related Art

The PFC (power factor correction) power converter is utilized to improve the power factor of AC power. The detail skill of the PFC converter can be found in prior arts, such as U.S. Pat. No. 7,116,090 "Switching control circuit for discontinuous mode PFC converters". The traditional PFC approach is to convert the AC input to a DC voltage that is higher than the peak value of the line voltage. However, it might cause problem when a high line voltage is inputted, such as 380 VAC, etc. The most popular power electronic devices and motors are designed for 240 VAC input. The object of the present invention is to develop a buck-boost PFC converter to solve this problem. The output voltage of this PFC converter can be lower or higher than the line voltage.

BRIEF SUMMARY OF THE INVENTION

An exemplary embodiment of a buck-boost PFC converter comprises an inductor, first and second transistors, a first diode, and a control circuit. The inductor has a first terminal and a second terminal. The first transistor is coupled to a positive-power rail and the first terminal of the inductor, wherein the positive-power rail receives a sine wave signal. The second transistor is coupled to the second terminal of the inductor and a negative-power rail. The first diode is connected from the second terminal of the inductor to an output of the buck-boost PFC converter. The control circuit generates a first signal and a second signal coupled to control the first transistor and the second transistor respectively. The first signal is utilized to turn on the first transistor for conducting the positive-power rail to the inductor. The second signal is utilized to turn on the second transistor for conducting the inductor to the negative-power rail.

Another exemplary embodiment of a buck-boost PFC converter comprises an inductor, two transistors, an input diode, an output diode, and a control circuit. The inductor is provided for the energy transfer. The transistors are coupled to an input power rail of the converter to charge the inductor when the transistors are on. The input diode and the output diode are coupled to the inductor to discharge the energy of the inductor to the output of the converter when the transistors are off. The control circuit generates switching signals coupled to control the switching of the transistors for regulating the output of the converter and achieving power factor correction. The output diode is coupled to the output of the converter; the input diode provides a free-wheeling path for the inductor when said the transistors are off; and the output voltage of the converter can be lower or higher than the voltage of the input power rail of the converter.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
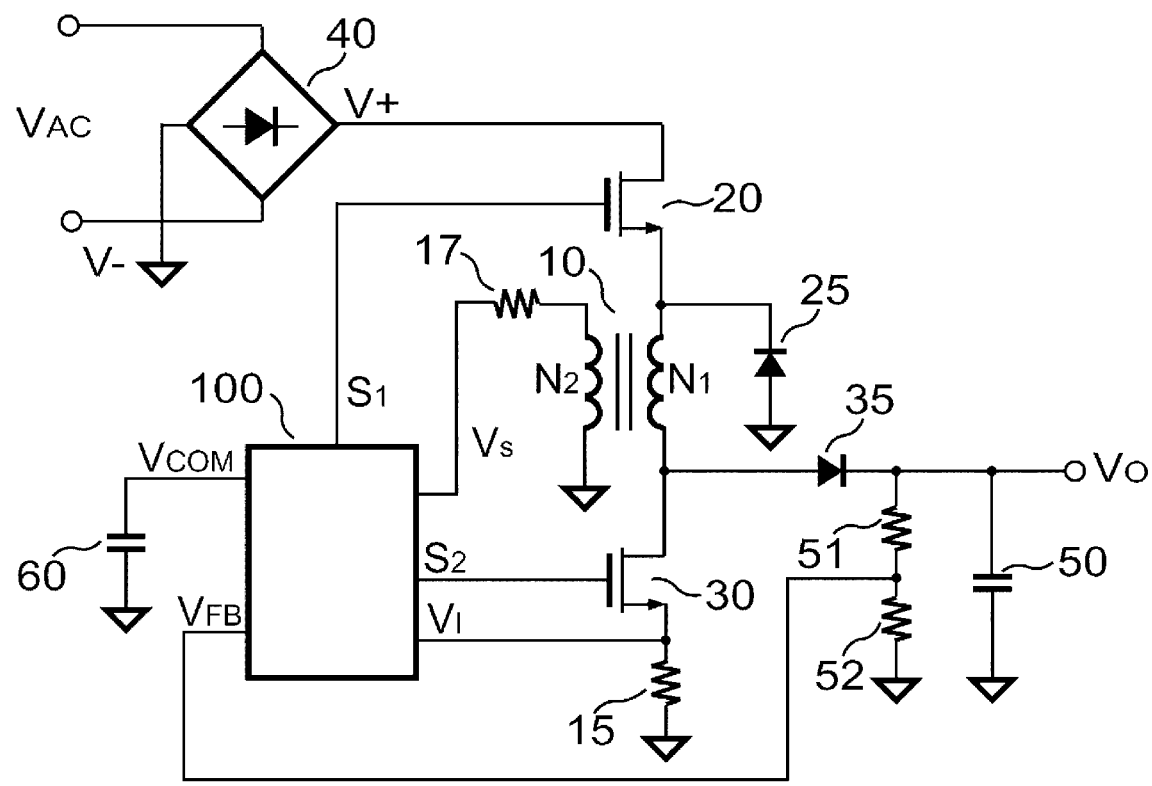
FIG. 1 shows an exemplary embodiment of a buck-boost PFC converter.

FIG. 1 shows an exemplary embodiment of a buck-boost PFC converter. It includes an inductor 10 having a first terminal and a second terminal at its first winding $N_1$. A first transistor 20 is coupled to a positive-power rail V+ and the first terminal of the inductor 10. In the embodiment, an AC voltage $V_{AC}$ which is a sine wave signal is provided to a rectifier 40, and the rectifier 40 provides rectified signal to the positive-power rail V+ according to the AC voltage $V_{AC}$. A second transistor 30 is coupled to the second terminal of the inductor 10 and a negative-power rail V−. A diode 35 (output diode) is coupled from the second terminal of the inductor 10 to the output $V_O$ of the converter. A capacitor 50 is also connected at the output $V_O$. Resistors 51 and 52 form a divider coupled to the output $V_O$ for producing a feedback signal $V_{FB}$. The feedback signal $V_{FB}$ is coupled to a control circuit 100. The control circuit 100 generates a first signal $S_1$ and a second signal $S_2$ in response to the feedback signal $V_{FB}$ for controlling the first transistor 20 and the second transistor 30 respectively. The first signal $S_1$ is utilized to turn on the first transistor 20 for conducting the positive-power rail V+ to the inductor 10. The second signal $S_2$ is utilized to turn on the second transistor 30 for conducting the inductor 10 to the negative-power rail V− via a resistor 15. The resistor 15 generates a current signal $V_I$ coupled to the control circuit 100. The current signal $V_I$ is correlated to the switching current of the inductor 10. An input diode 25 is connected from the first terminal of the inductor 10 to the negative-power rail V− for cycling the energy of inductor 10 when first signal $S_1$ and second signal $S_2$ are turned off. The first transistor 20 and the second transistor 30 are switched on/off simultaneously. In practice, two transistors 20 and 30 are coupled to the input power rail comprising positive-power rail V+ and negative-power rail V− to charge the inductor 10 when the transistors 20 and 30 are on. The input diode 25 and the output diode 35 are coupled to the inductor 10 to discharge the energy of the inductor 10 to the output $V_O$ of the converter when the transistors 20 and 30 are off. The output diode 35 is coupled to the output $V_O$ of the converter. The input diode 25 provides a free-wheeling path for the inductor 10 when the transistors 20 and 30 are off. The inductor 10 further includes a second winding $N_2$ generating a reflected signal $V_S$ coupled to the control circuit 100 through the resistor 17. The control circuit 100 generates the first signal $S_1$ and the second signal $S_2$ in response to the reflected signal $V_S$. The output voltage $V_O$ of the power converter can be determined by following equation.

$$V_O = \frac{T_{ON}}{T - T_{ON}} \times V_+ \quad (1)$$

where $T_{ON}$ is the on time of the transistors 20 and 30, T is the switching period of the first signal $S_1$ and the second signal $S_2$, and $V_+$ is the voltage for the positive-power rail V+. So the output voltage $V_O$ of the converter can be lower or higher than the voltage V+ of the input power rail V+, V− of the converter according to the equation.

Figure 2:
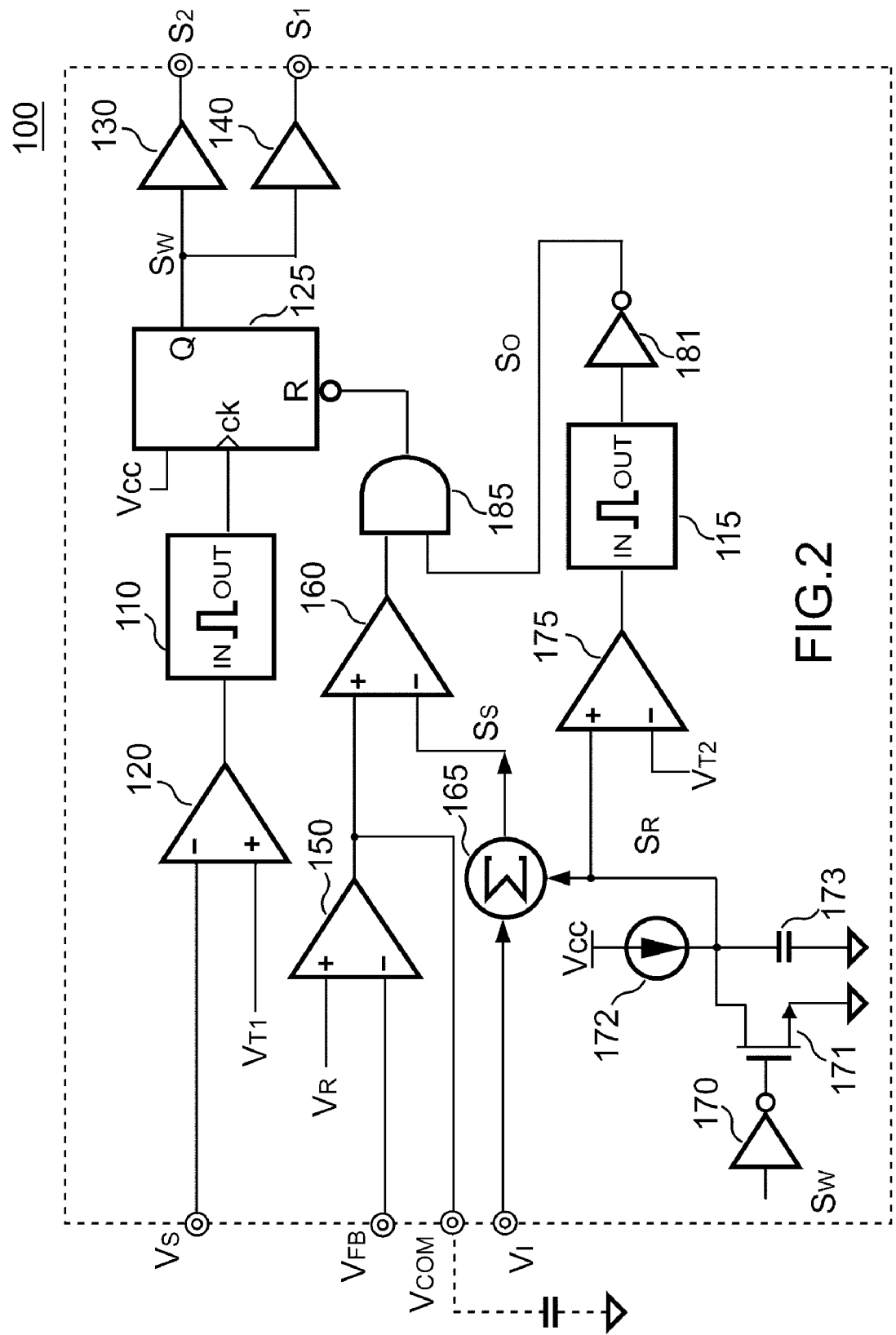
FIG. 2 shows a preferred embodiment of a control circuit.

FIG. 2 shows an embodiment of the control circuit 100. An comparator 120 is coupled to receive the reflected signal $V_S$. The comparator 120 will trigger a pulse generator 110 once the reflected signal $V_S$ is lower than a threshold $V_{T1}$. An output pulse signal of the pulse generator 110 is used to enable a flip-flop 125 for generating a PWM signal $S_W$. The PWM signal $S_W$ is further coupled to generate the first signal $S_1$ and the second signal $S_2$ through buffers 130 and 140 respectively. The PWM signal $S_W$ is disabled by resetting the flip-flop 125. An AND gate 185 is connected to reset the flip-flop 125. The first input of the AND gate 185 is connected to the output of a comparator 160. The first input of the comparator 160 is connected to a signal $V_{COM}$. The output of an operational amplifier 150 generates the signal $V_{COM}$. The output of the operational amplifier 150 is coupled to the capacitor 60 for the frequency compensation. The positive-input of the operational amplifier 150 is a reference signal $V_R$. The feedback signal $V_{FB}$ is connected to the negative-input of the operational amplifier 150. The second input of the comparator 160 is the output of an adder 165. The adder 165 generates a slope signal $S_S$ by adding a ramp signal $S_R$ with the current signal $V_I$. The ramp signal $S_R$ is generated in response to the PWM signal $S_W$. The flip-flop 125 will be reset once the slope signal $S_S$ is higher than the signal $V_{COM}$. The PWM signal $S_W$ is coupled to turn on/off a transistor 171 through the inverter 170. A current source 172 is connected to charge a capacitor 173. The transistor 171 is used for discharging the capacitor 173. Therefore, the ramp signal $S_R$ is generated at the capacitor 173 in response to the PWM signal $S_W$. The ramp signal $S_R$ is further connected to a comparator 175. The comparator 175 will enable a pulse generator 115 when the ramp signal $S_R$ is higher than a threshold $V_{T2}$. An output pulse signal $S_O$ of the pulse generator 115 is coupled to reset flip-flop 125 through the AND gate 185 and an inverter 181. Therefore, the maximum on time of the first signal $S_1$ and the second signal $S_2$ are limited by the capacitance of the capacitor 173 and the threshold $V_{T2}$.

Figure 3:
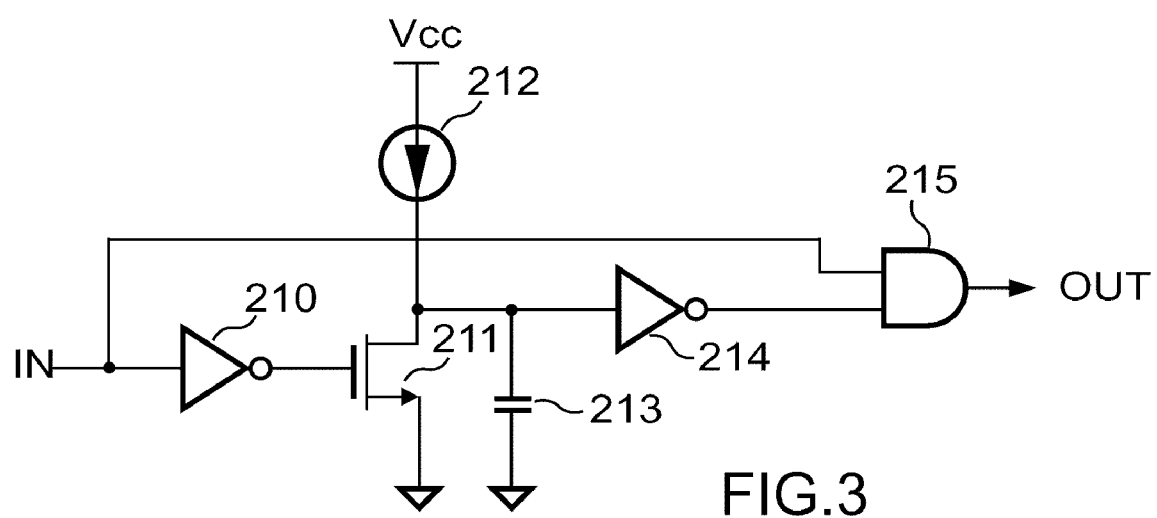
FIG. 3 shows a preferred embodiment of a pulse generator.

FIG. 3 shows the circuit schematic of the pulse generator 110 and 115. Referring to FIG. 3, a current source 212 is connected to charge a capacitor 213. A transistor 211 is connected to discharge the capacitor 213. A signal IN is connected to control the transistor 211 through an inverter 210. The signal IN is further connected to an input of an AND gate 215. Another input of the AND gate 215 is coupled to the capacitor 213 via an inverter 214. The pulse width of the output pulse signal OUT of the pulse generator is determined by the current of the current source 212 and the capacitance of the capacitor 213. In the embodiment, if the pulse generator of FIG. 3 is applied for the pulse generator 110 of FIG. 2, the signal IN is provided from the output of the comparator 120, and the output pulse signal OUT is provided to enable the flip-flop 125 for generating the PWM signal $S_W$. If the pulse generator of FIG. 3 is applied for the pulse generator 115 of FIG. 2, the signal IN is provided from the output of the comparator 175, and the output pulse signal OUT is provided to the input of the inverter 181.

In summary, a buck-boost PFC converter is provided according to the present invention. Therefore, the PFC power converter of the invention can convert the AC input to a DC voltage that is higher or lower than the peak value of the line voltage.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A buck-boost PFC converter comprising:
   an inductor having a first winding and a second winding, and the first and second winding having a first terminal and a second terminal, respectively;
   a first transistor coupled to a positive-power rail and the first terminal of the first winding of the inductor, wherein a sine wave signal is provided to the positive-power rail;
   a second transistor coupled to the second terminal of the first winding of the inductor and a negative-power rail;
   a first diode connected from the second terminal of the first winding of the inductor to an output of the buck-boost PFC converter;
   a second diode connected from the first terminal of the first winding of the inductor to the negative-power rail; and
   a control circuit generating a first signal and a second signal coupled to control the first transistor and the second transistor respectively;
   wherein the first signal is utilized to turn on the first transistor for conducting the positive-power rail to the inductor, and the second signal is utilized to turn on the second transistor for conducting the inductor to the negative-power rail.

2. The PFC converter as claimed in claim 1, in which the first transistor and the second transistor are switched on/off simultaneously.

3. The PFC converter as claimed in claim 1, wherein the second winding generates a reflected signal coupled to the control circuit, and the control circuit generates the first signal and the second signal in response to the reflected signal.

4. The PFC converter as claimed in claim 1, in which the maximum on time of the first signal and the second signal are limited by the control circuit.

5. The PFC converter as claimed in claim 1, further comprises:
   a first resistor coupled between the second transistor and the negative-power rail and generating a current signal; and
   a divider coupled to the output of the buck-boost PFC converter and producing a feedback signal,
   in which the second winding generates a reflected signal coupled to the control circuit, and the control circuit generates the first signal and the second signal in response to the current signal, the feedback signal, and the reflected signal.

6. The PFC converter as claimed in claim 5, in which the control circuit comprises:
   a flip-flop generating a PWM signal;
   a first buffer receiving the PWM signal and generating the first signal; and
   a second buffer receiving the PWM signal and generating the second signal;

in which the flip-flop is enabled in response to the reflected signal for generating the PWM signal and reset in response to the feedback signal and the current signal for disabling the PWM signal.

7. A buck-boost PFC converter comprising:

an inductor for the energy transfer, having a first winding and a second winding, and the first and second winding having a first terminal and a second terminal, respectively;

two transistors coupled to an input power rail of the PFC converter to charge the inductor when the transistors are on;

an input diode and an output diode coupled to the inductor to discharge the energy of the inductor to an output of the PFC converter when the transistors are off; and a control circuit generating switching signals coupled to control the switching of the transistors for regulating an output voltage of the PFC converter and achieving power factor correction;

wherein the output diode is connected from the second terminal of the first winding of the inductor to the output of the PFC converter, the input diode is connected from the first terminal of the first winding of the inductor to the negative-power rail and provides a free-wheeling path for the inductor when the transistors are off, and the output voltage of the PFC converter can be lower or higher than a voltage of the input power rail of the PFC converter.

8. The PFC converter as claimed in claim 7, in which the transistors are switched on/off simultaneously.

9. The PFC converter as claimed in claim 7, in which the first winding of the inductor is coupled to the transistors and the second winding of the inductor generates a reflected signal coupled to the control circuit, and the control circuit generates the switching signals in response to the reflected signal.

10. The PFC converter as claimed in claim 7, in which the maximum on time of the switching signals is limited by the control circuit.

* * * * *